(12) United States Patent
Sung et al.

(10) Patent No.: US 6,853,799 B2
(45) Date of Patent: Feb. 8, 2005

(54) LIGHTGUIDE AND METHOD FOR MANUFACTURING THE SAME

(75) Inventors: Guang-Tau Sung, Tai-chung Hsien (TW); Chen-Hua Liu, Taipei (TW)

(73) Assignee: Au Optronics Corp., Hsinchu (TW)

( * ) Notice: Subject to any disclaimer, the term of this patent is extended or adjusted under 35 U.S.C. 154(b) by 43 days.

(21) Appl. No.: 10/676,022

(22) Filed: Oct. 2, 2003

(65) Prior Publication Data

US 2004/0062513 A1 Apr. 1, 2004

Related U.S. Application Data

(62) Division of application No. 09/981,707, filed on Oct. 19, 2001, now Pat. No. 6,680,010.

(30) Foreign Application Priority Data

Oct. 21, 2000 (TW) ........................................ 89122153 A

(51) Int. Cl.[7] ............................ G02B 6/10; G02B 6/00; B29D 11/00
(52) U.S. Cl. ........................ 385/146; 264/1.24; 385/147
(58) Field of Search ........................ 385/133, 146–147, 385/901, 902; 264/1.24, 1.6, 1.7, 255

(56) References Cited

U.S. PATENT DOCUMENTS

| 6,132,652 A | * 10/2000 | Higuchi et al. ............... 264/1.7 |
| 2002/0048444 A1 | * 4/2002 | Sung et al. .................. 385/133 |
| 2004/0062513 A1 | * 4/2004 | Sung et al. .................. 385/146 |

FOREIGN PATENT DOCUMENTS

| JP | 8-227273 | 9/1996 |
| JP | 8-279307 | 10/1996 |
| JP | 8-286043 | 11/1996 |
| JP | 10-104434 | 4/1998 |

* cited by examiner

*Primary Examiner*—Akm Enayet Ullah
(74) *Attorney, Agent, or Firm*—Bacon & Thomas, PLLC

(57) ABSTRACT

A lightguide having either a built-in prism sheet or a built-in diffuser sheet is disclosed. The lightguide includes: a prism sheet having a plane surface and a surface with a plurality of patterned microlens; a transparent wedge having a cross-section of trapezoid; and a binder layer sandwiched between said plane surface of said prism sheet and said transparent wedge. A method for manufacturing the lightguide is also disclosed here.

12 Claims, 3 Drawing Sheets

LIGHTGUIDE AND METHOD FOR MANUFACTURING THE SAME

This application is a divisional application of U.S. application Ser. No. 09/981,707, filed Oct. 19, 2001, now U.S. Pat. No. 6,680,010 (of which the entire disclosure of the pending, prior application is hereby incorporated by reference), which has been allowed and the Issue Fee paid on Sep. 26, 2003.

BACKGROUND OF THE INVENTION

1. Field of the Invention

The present invention relates to a lightguide and, more particularly, to a lightguide for flat panel display devices and method for manufacturing the lightguides

2. Description of Related Art

Currently, lightguides are widely used in flat panel display device (e.g. liquid crystal display device) to distribute the light of backlight module. Generally, a backlight module includes a lightguide, a plurality of prism sheets and a plurality of diffuser sheets. However, since many sheets are required in the traditional backlight module, the thickness of traditional backlight module is great and hard to be reduced.

In recent years, in order to reduce the thickness of the traditional backlight module, a prismless backlight module is introduced to the flat panel display. However, the manufacturing processing of the components of the prismless backlight module is complicated. The surface of the lightguide is required to form a plurality of microlens. It takes long time to processing. Although this kind of lightguide can be made through inject molding, the cost for manufacturing molds is high. The time needs for manufacturing these kinds of molds is very long. In addition, the wearing of these kinds of molds is serious as they are used for mass-production. In other words, the lifetime of these molds for these lightguides is short. Therefore, these kinds of molds and lightguides are not suitable for being applied for mass-production.

Therefore, it is desirable to provide an improved speech recognition method to mitigate the aforementioned problems.

SUMMARY OF THE INVENTION

The object of the present invention is to provide a lightguide with low cost of material, low thickness and less weight.

Another object is to provide a lightguide having an additional function for diffusing or distributing light.

Another object is to provide a method for manufacturing a lightguide having an additional function for diffusing or distributing light.

Another object is to provide a method for manufacturing various lightguides with different patterns of prisms without cutting patterns of microlens on molds.

Another object is to provide a method for manufacturing various lightguides through simple inject molding.

To achieve the object, the lightguide of the present invention includes: a prism sheet having a plane surface and a surface with a plurality of patterned microlens; a transparent wedge having a cross-section of trapezoid; and a binder layer sandwiched between said plane surface of said prism sheet and said transparent wedge, wherein said binder and said prism sheet are made from substantially identical or different materials.

The laminated film of the present invention for manufacturing a lightguide, comprising: a carrier sheet; a prism sheet having a plane surface and a patterned surface with a plurality of microlens; a protection sheet sandwiched between said carrier sheet and said patterned surface of said prism sheet, wherein said protection sheet has a patterned surface to contact with said prism sheet, and the pattern of said patterned surface of said protection layer is complementary to the pattern of said prism; and a binder layer attached on said plane surface of said prism sheet; wherein said binder and said prism sheet are made from substantially identical or different materials.

Another laminated film of the present invention for manufacturing a lightguide, comprising: a carrier sheet; a prism sheet having a plane surface and a patterned surface with a plurality of microlens; a diffuser sheet sandwiched between said carrier sheet and said patterned surface of said prism sheet, wherein said diffuser sheet has a patterned surface to contact with said prism sheet, and the pattern of said patterned surface of said diffuser layer is complementary to the pattern of said prism; a protection sheet for protecting said prism sheet or said diffuser sheet, wherein said protection sheet is sandwiched between said carrier sheet and said diffuser sheet; a binder layer attached on said plane surface of said prism sheet; wherein said binder and said prism sheet are made from substantially identical or different materials.

The method of the present invention for manufacturing a lightguide, comprising following steps: (A) providing a mold having a laminated film inside, said laminated film comprising: a carrier sheet; a prism sheet having a plane surface and a patterned surface with a plurality of microlens; a protection sheet sandwiched between said carrier sheet and said patterned surface of said prism sheet, wherein said protection sheet has a patterned surface to contact with said prism sheet, and the pattern of said patterned surface of said protection layer is complementary to the pattern of said prism; and a binder layer attached on said plane surface of said prism sheet; (B) injecting a polymer into said mold with said laminated film; (C) opening said mold and taking out the molding; and (D) releasing said carrier sheet and said protection sheet from said molding.

Another method of the present invention for manufacturing a lightguide, comprising following steps: (A) providing a mold having a laminated film inside, said laminated film comprising: a carrier sheet; a prism sheet having a plane surface and a patterned surface with a plurality of microlens; a diffuser sheet sandwiched between said carrier sheet and said patterned surface of said prism sheet, wherein said diffuser sheet has a patterned surface to contact with said prism sheet, and the pattern of said patterned surface of said diffuser layer is complementary to the pattern of said prism; a protection sheet for protecting said prism sheet or said diffuser sheet, wherein said protection sheet is sandwiched between said carrier sheet and said diffuser sheet; a binder layer attached on said plane surface of said prism sheet; wherein said binder and said prism sheet are made from substantially identical or different materials; (B) injecting a polymer into said mold with said laminated film; (C) opening said mold and taking out the molding; and (D) releasing said carrier sheet and said protection sheet from said molding.

Other objects, advantages, and novel features of the invention will become more apparent from the following detailed description when taken in conjunction with the accompanying drawings.

DETAILED DESCRIPTION OF THE PREFERRED EMBODIMENT

The binder used here can be any conventional binder. Generally, the binder of the present invention is an organic polymer with low softening temperature or polymer compositions. The binder binds prism sheet and injected polymer as polymer is injected into the mold. The materials of binder can be identical as or different from that of the transparent wedge for lightguide. The carrier can be a continuous or discontinuous material. The surface of the carrier can be either smooth or rough. The carrier cane be used alone. Or the carrier can be used incorporated with release. Preferably, carrier is made from PET, ceramics, metals or rubber. The protection sheet can be made from any materials resistant to scratches, cuttings and impact. The lightguide of the present invention can selectively further comprises a patterned diffuser sheet. The pattern of said diffuser sheet is selectively complementary to the pattern of said prism sheet. The surface contrary to said patterned surface of said diffuser sheet can be either a plane surface or optionally a surface with substantially identical patterns. The transparent wedge can be made from any transparent materials. Preferably, the transparent wedge is made from polycarbonate or polymethacrylate. The lightguide of the present invention can be used for any flat panel display devices. Preferably, the lightguide of the present invention can be used for a liquid crystal display device. The protection sheet of the present invention and the carrier sheet can be either two different sheets. Optionally, the protection sheet of the present invention can be integrated with the carrier sheet. The laminated film can selectively further comprise a release layer. The release layer is sandwiched by said protection sheet and said prism sheet. In the method of the present invention for manufacturing a lightguide, the laminated film can be supplied through any conventional method. Preferably, the laminated film is provided or supplied continuously.

Figure 1:
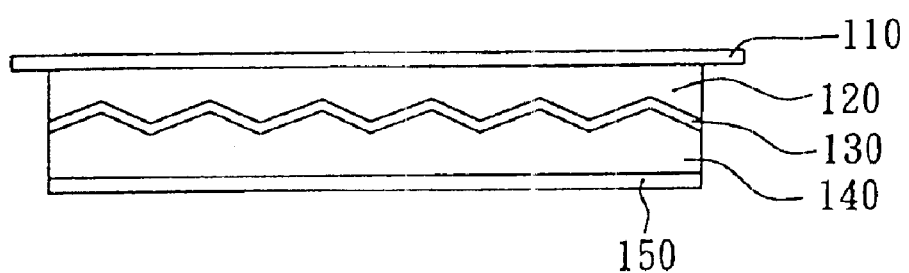
FIG. 1 is a perspective view of the first embodiment of the laminated film of the present invention.

With reference to FIG. 1, there is shown the first embodiment of the laminated film of the present invention. The laminated film of the first embodiment of the invention is used for manufacturing a lightguide for a flat panel display device (e.g. a liquid crystal display device). The laminated film 100 includes a carrier sheet 110, a protection sheet 120, a release layer 130, a prism sheet 140 and a binder layer 150. The carrier sheet 110 acts as a matrix or a substrate for subsequent attachment of other sheets or layers. In the first embodiment of the present invention, the carrier sheet is a PET sheet. Beneath the carrier sheet 110, there is a protection sheet 120. The protection sheet 120 prevents prism sheet 140 from scratching, wearing or direct impact. Therefore, the pattern of microlens on the prism sheet 140 can be well protected and reserved. One of the surfaces of the prism sheet 140 of the first embodiment is filled with patterns of microlens. The pattern of the microlens on the prism sheet 140 focuses most light (e.g. from the bottom of the laminated film 100) in the same direction (e.g. to the top side of the laminated film 100) to increase the intensity of light on the top surface of the laminated film 100. On the other hand, the surface of the protection sheet is also a patterned surface. The pattern on the surface of the protection sheet is just complementary to the pattern of the microlens of the prism sheet 140. In addition, the other surface of the prism sheet 140 is a plane surface. The plane surface is selectively coated with a layer of binder 150. The binder layer 150 is used for subsequent combination with a transparent wedge. In the first embodiment of the laminated film of the present invention, a release layer 130 is coated between the prism sheet 140 and the protection sheet 120. The release layer 130 is designed to ease the molding with prism sheet 140 to release from the molds and the protection sheet 120 after subsequent transparent wedge is attached (e.g. through inject molding or extrusion molding). The carrier sheet 110 and the protection sheet 120 can be selectively integrated as one layer to save the thickness or reduce the cost of materials.

Figure 3:
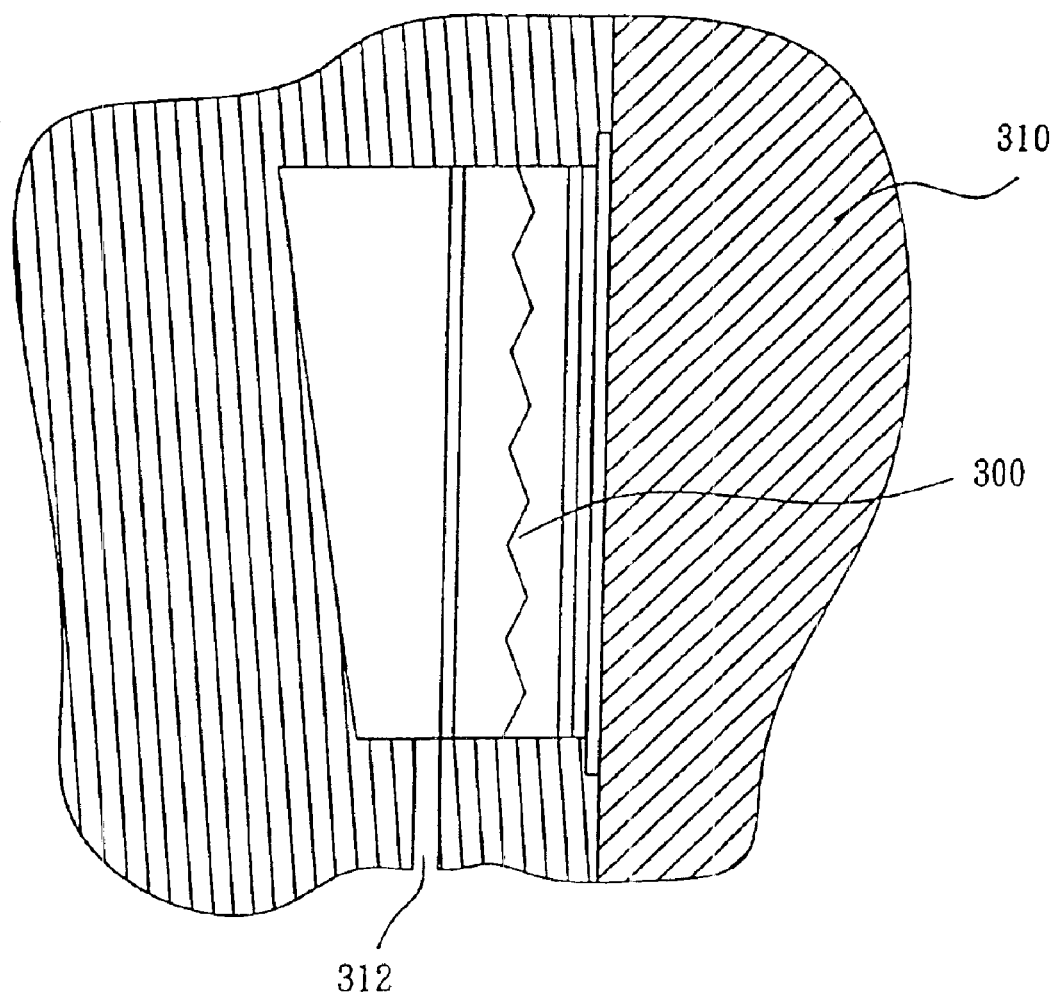
FIG. 3 is a perspective view of method for manufacturing the lightguide of the present invention.

The method for manufacturing a light guide can be shown in FIG. 3. A laminated film 300 as illustrated above is attached and fixed on the inside surface of a mold 310 for a lightguide. A polymer for forming the transparent wedge of the lightguide is injected into the mold through an opening 312 after the mold is closed. The polymer used here is PMMA (or polycarbonate). As the polymer is injected into the mold 310, the binder on the plane surface of the prism sheet is melt and combined with the injected polymer. Therefore, as the transparent wedge of the lightguide forms, the laminated film 300 and the transparent wedge will bind together. Then, the mold is opened and the molding is taken out from the mold. After the carrier sheet and the protection sheet is released, a lightguide with prism sheet can be obtained.

Figure 2:
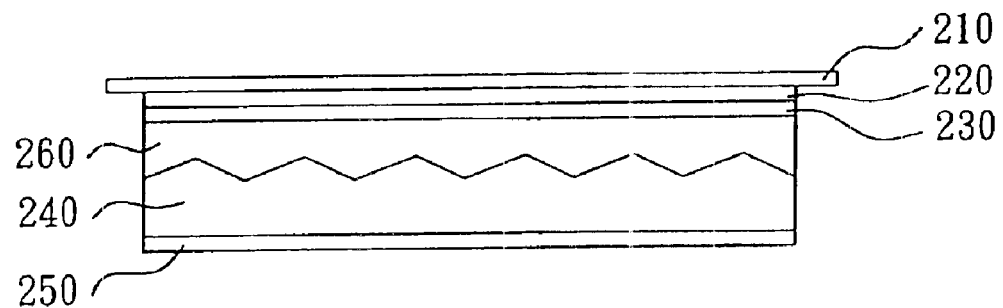
FIG. 2 is a perspective view of the second embodiment of the laminated film of the present invention.

With reference to FIG. 2, there is shown the second embodiment of the laminated film of the present invention. The laminated film of the second embodiment of the invention is also used for manufacturing a lightguide for a flat panel display device (e.g. a liquid crystal display device). The laminated film 200 includes a carrier sheet 210, a protection sheet 220, a release layer 230, a prism sheet 240, a binder layer 250 and a diffuser sheet 260. The carrier sheet 210 acts as a matrix or a substrate for subsequent attachment of other sheets or layers. In the second embodiment of the present invention, the carrier sheet is a PET sheet. Beneath the carrier sheet 210, there is a protection sheet 220. Furthermore, beneath the protection sheet 220, there is a diffuser sheet 260. The protection sheet 220 prevents the diffuser sheet 260 from scratching, wearing or direct impact. Further beneath the diffuser sheet 260, there is a prism sheet 240 with patterned microlens. The other surface (bottom surface) of the prism sheet 240 is coated with a layer of binder 250. The bottom surface of the diffuser sheet 260 is a patterned surface. The pattern on the surface of the diffuser sheet 260 is just complementary to the pattern of the microlens of the prism sheet 240. he pattern of the microlens on the prism sheet 240 focuses most light (e.g. from the bottom of the laminated film 200) in the same direction (e.g. to the top side of the laminated film 200) to increase the intensity of light on the top surface of the laminated film 200. The diffuser sheet 260 helps to distribute the light from prism sheet 240 much more homogeneously. The binder layer 250 is used for subsequent combination with a transparent wedge. In the second embodiment of the laminated film 200 of the present invention, a release layer 230 is coated between the diffuser sheet 240 and the protection sheet 220. The release layer 230 is designed to ease the molding with diffuser sheet 260 to release from the molds and the protection sheet 220 after subsequent transparent wedge is attached (e.g. through inject molding or extrusion molding). Moreover, the carrier sheet 210 and the protection sheet 220 can be selectively integrated as one layer to save the thickness or reduce the cost of materials.

Figure 4:
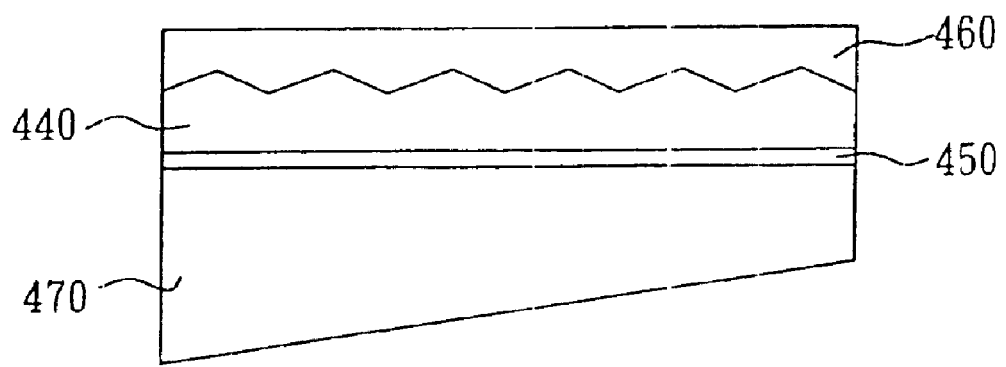
FIG. 4 is a perspective view of the second embodiment of the lightguide of the present invention.

A laminated film as illustrated in second embodiment is also used for the manufacturing of a lightguide. The steps for manufacturing a lightguide with a laminated film as illustrated in second embodiment is similar to that of laminated film as illustrated in first embodiment. The laminated film as illustrated in second embodiment is attached and fixed on the inside surface of a mold for a lightguide. A polymer for forming the transparent wedge of the lightguide is injected into the mold through an opening after the mold is closed. The polymer used here is polycarbonate. As the polymer is injected into the mold, the binder on the plane surface of the prism sheet is melt and combined with the injected polymer. Therefore, as the transparent wedge of the lightguide forms, the laminated film and the transparent wedge will bind together. Then, the mold is opened and the molding is taken out from the mold. After the carrier sheet and the protection sheet is released, a lightguide with a built-in prism sheet 440, a built-in diffuser 450 and transparent wedge 470 can be obtained (as shown in FIG. 4).

Since there is a built-in diffuser or a built-in prism in lightguide of the present invention, the lightguide of the present invention has function of a diffuser, a prism and a lightguide. In other words, one lightguide of the present invention functions as a combination of a conventional diffuser sheet, a conventional prism sheet and a lightguide. Therefore, compared with the traditional backlight module of a conventional lightguide and diffuse sheets, prism sheets, the thickness, the weight, and the cost of a backlight module with the lightguide of the present invention can be greatly reduced. On the other hand, since a laminated film with predetermined pattern of prism sheet is used in the method for manufacturing a lightguide here, the pattern of the prism can be changed very easily and quickly to meet any special requirement. The manufacturing method of the present invention saves lots of time and cost for cutting grooves on molds as the pattern of the prism is asked to change. Furthermore, it also saves space for storing molds for manufacturing lightguides with different prism patterns. In addition, since the prism can be changed very quickly and frequently. The manufacturing method of the present invention can be applied to mass-production of lightguides very easily. Even the wearing of prism sheet is serious, new prism can be replaced very easily and quickly into a mold (just change the laminated films). Therefore, the manufacturing method of the present invention is very easy for maintenance.

Although the present invention has been explained in relation to its preferred embodiment, it is to be understood that many other possible modifications and variations can be made without departing from the spirit and scope of the invention as hereinafter claimed.

What is claimed is:

1. A lightguide comprising:
    a prism sheet having a plane surface and a surface with a plurality of patterned microlens;
    a transparent wedge having a cross-section of trapezoid; and
    a binder layer sandwiched between said plane surface of said prism sheet and said transparent wedge,
    wherein said binder and said prism sheet are made from substantially identical or different materials.

2. The lightguide as claimed in claim 1, further comprising a patterned diffuser sheet, wherein the pattern of said diffuser sheet is complementary to the pattern of said prism sheet.

3. The lightguide as claimed in claim 2, wherein the other surface contrary to said patterned surface of said diffuser sheet is a plane surface.

4. The lightguide as claimed in claim 2, wherein the two contrary surfaces of said diffuser sheet have substantially identical patterns.

5. The lightguide as claimed in claim 1, wherein said transparent wedge is made from polycarbonate or polymethacrylate.

6. The lightguide as claimed in claim 1, wherein said lightguide applied for a liquid crystal display device.

7. A laminated film for manufacturing a lightguide, comprising:
    a carrier sheet;
    a prism sheet having a plane surface and a patterned surface with a plurality of microlens;
    a protection sheet sandwiched between said carrier sheet and said patterned surface of said prism sheet, wherein said protection sheet has a patterned surface to contact with said prism sheet, and the pattern of said patterned surface of said protection layer is complementary to the pattern of said prism; and
    a binder layer attached on said plane surface of said prism sheet;
    wherein said binder and said prism sheet are made from substantially identical or different materials.

8. The laminated film as claimed in claim 7, wherein said protection sheet is integrated with said carrier sheet.

9. The laminated film as claimed in claim 7, further comprising a release layer, wherein said release layer is sandwiched by said protection sheet and said prism sheet.

10. A laminated film for manufacturing a lightguide, comprising:
    a carrier sheet;
    a prism sheet having a plane surface and a patterned surface with a plurality of microlens;
    a diffuser sheet sandwiched between said carrier sheet and said patterned surface of said prism sheet, wherein said diffuser sheet has a patterned surface to contact with said prism sheet, and the pattern of said patterned surface of said diffuser layer is complementary to the pattern of said prism;
    a protection sheet for protecting said prism sheet or said diffuser sheet, wherein said protection sheet is sandwiched between said carrier sheet and said diffuser sheet; and
    a binder layer attached on said plane surface of said prism sheet;
    wherein said binder and said prism sheet are made from substantially identical or different materials.

11. The laminated film as claimed in claim 10, wherein said protection sheet is integrated with said carrier sheet.

12. The laminated film as claimed in claim 10, further comprising a release layer, wherein said release layer is sandwiched by said protection sheet and said prism sheet.

* * * * *